US012140887B2

(12) United States Patent
Yoshioka et al.

(10) Patent No.: US 12,140,887 B2
(45) Date of Patent: Nov. 12, 2024

(54) IMAGE FORMING APPARATUS FOR PRINTING IMAGE ON NONBENDABLE MEDIUM

(71) Applicant: FUJIFILM Business Innovation Corp., Tokyo (JP)

(72) Inventors: Tomoaki Yoshioka, Kanagawa (JP); Tetsuro Kodera, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/978,945

(22) Filed: Nov. 1, 2022

(65) Prior Publication Data

US 2023/0418185 A1 Dec. 28, 2023

(30) Foreign Application Priority Data

Jun. 28, 2022 (JP) ................................ 2022-103396

(51) Int. Cl.
*G03G 15/14* (2006.01)
*G03G 15/00* (2006.01)
(Continued)

(52) U.S. Cl.
CPC ......... *G03G 15/14* (2013.01); *G03G 15/0136* (2013.01); *G03G 15/0189* (2013.01);
(Continued)

(58) Field of Classification Search
CPC ........... G03G 15/14; G03G 2215/1623; G03G 15/0136; G03G 15/0189; G03G 15/1605; G03G 15/1625; G03G 15/165; G03G 15/1655; G03G 15/166; G03G 15/1665; G03G 15/167; G03G 15/1685; G03G 15/6529; G03G 15/6558; G03G 2215/00371; G03G 2215/00379; G03G 2215/00409; G03G 2215/00523;
(Continued)

(56) References Cited

U.S. PATENT DOCUMENTS

| | | | |
|---|---|---|---|
| 6,146,805 | A | 11/2000 | Yoshimura et al. |
| 2002/0009317 | A1 | 1/2002 | Onodera |

(Continued)

FOREIGN PATENT DOCUMENTS

| | | |
|---|---|---|
| EP | 3231579 | 10/2017 |
| JP | 3292954 | 6/2002 |
| JP | 6900650 | 7/2021 |
| WO | 2004086150 | 10/2004 |

OTHER PUBLICATIONS

"Search Report of Europe Counterpart Application", issued on Nov. 16, 2022, pp. 1-8.

*Primary Examiner* — Joseph S Wong
(74) *Attorney, Agent, or Firm* — JCIPRNET

(57) ABSTRACT

An image forming apparatus includes: an attachment table to which an object is attached; a transfer unit that transfers an image onto the object; and a transport unit that transports the attachment table along a transport path that has a transport start position on one side relative to the transfer unit and has a transport end position on a same side as the transport start position relative to the transfer unit, the transport path extending beyond the transfer unit and the attachment table being transported so as to turn back at a position beyond the transfer unit.

8 Claims, 7 Drawing Sheets

(51) Int. Cl.
*G03G 15/01* (2006.01)
*G03G 15/16* (2006.01)

(52) U.S. Cl.
CPC ..... *G03G 15/1605* (2013.01); *G03G 15/1625* (2013.01); *G03G 15/165* (2013.01); *G03G 15/1655* (2013.01); *G03G 15/166* (2013.01); *G03G 15/1665* (2013.01); *G03G 15/167* (2013.01); *G03G 15/1685* (2013.01); *G03G 15/6529* (2013.01); *G03G 15/6558* (2013.01); *G03G 2215/00371* (2013.01); *G03G 2215/00379* (2013.01); *G03G 2215/00409* (2013.01); *G03G 2215/00523* (2013.01); *G03G 2215/00527* (2013.01); *G03G 2215/00679* (2013.01); *G03G 2215/00708* (2013.01); *G03G 2215/00919* (2013.01); *G03G 2215/1623* (2013.01)

(58) Field of Classification Search
CPC .......... G03G 2215/00527; G03G 2215/00679; G03G 2215/00708; G03G 2215/00919
See application file for complete search history.

(56) References Cited

U.S. PATENT DOCUMENTS

| | | | | |
|---|---|---|---|---|
| 2002/0018675 | A1* | 2/2002 | Akema .............. | G03G 15/2064 399/320 |
| 2017/0001381 | A1 | 1/2017 | Suzuki et al. | |
| 2017/0299973 | A1 | 10/2017 | Frauens | |
| 2022/0311876 | A1* | 9/2022 | Kawaoka ............. | H04N 1/0057 |
| 2023/0418204 | A1* | 12/2023 | Takahashi .......... | G03G 15/6594 |

* cited by examiner

IMAGE FORMING APPARATUS FOR PRINTING IMAGE ON NONBENDABLE MEDIUM

CROSS-REFERENCE TO RELATED APPLICATIONS

This application is based on and claims priority under 35 USC 119 from Japanese Patent Application No. 2022-103396 filed Jun. 28, 2022.

BACKGROUND

(i) Technical Field

The present disclosure relates to an image forming apparatus.

(ii) Related Art

In recent years, there are cases where an image is printed on any of media having various thicknesses and shapes such as metal, glass, and tile.

Japanese Patent No. 3292954 discloses a printing method for printing an image on a print surface of a printed material made of a synthetic resin plate, wood, or ceramic having a thickness of 0.3 mm or more by transferring charged toner on a transfer belt onto the print surface.

SUMMARY

Since a hard medium such as metal, glass, or tile cannot be bent during transport, a way in which a medium transport path is arranged in an image forming apparatus is restricted, for example, to linear arrangement, and therefore it is difficult to reduce a size of the apparatus.

Aspects of non-limiting embodiments of the present disclosure relate to a technique of reducing a size of an apparatus by shortening a medium transport path as compared with a configuration in which a medium transport path from a start position to an end position is linear.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image forming apparatus including: an attachment table to which an object is attached; a transfer unit that transfers an image onto the object; and a transport unit that transports the attachment table along a transport path that has a transport start position on one side relative to the transfer unit and has a transport end position on a same side as the transport start position relative to the transfer unit, the transport path extending beyond the transfer unit and the attachment table being transported so as to turn back at a position beyond the transfer unit.

BRIEF DESCRIPTION OF THE DRAWINGS

An exemplary embodiment of the present disclosure will be described in detail based on the following figures, wherein:

FIG. 3A illustrates how the height is controlled, FIG. 3B illustrates a state where an attachment table has retreated to a preparation position after the height control, and FIG. 3C illustrates a state where the transfer unit starts transfer of an image;

FIG. 4A illustrates a state where openings of the fixing unit are closed, and FIG. 4B illustrates a state where the openings of the fixing unit are opened;

DETAILED DESCRIPTION

An exemplary embodiment of the present disclosure is described in detail below with reference to the attached drawings. An image forming apparatus according to the present exemplary embodiment is an image forming apparatus employing digital printing. Although an electrophotographic system, an inkjet system, and the like are known as digital printing systems, the electrophotographic system is assumed in the present exemplary embodiment. In the electrophotographic system, a transfer unit and a medium are brought into contact with each other when an image is transferred onto the medium. Furthermore, in the present exemplary embodiment, any of media having various thicknesses and shapes such as metal, glass, and tile is assumed as an object on which an image is to be printed.

Apparatus Configuration

Figure 1:
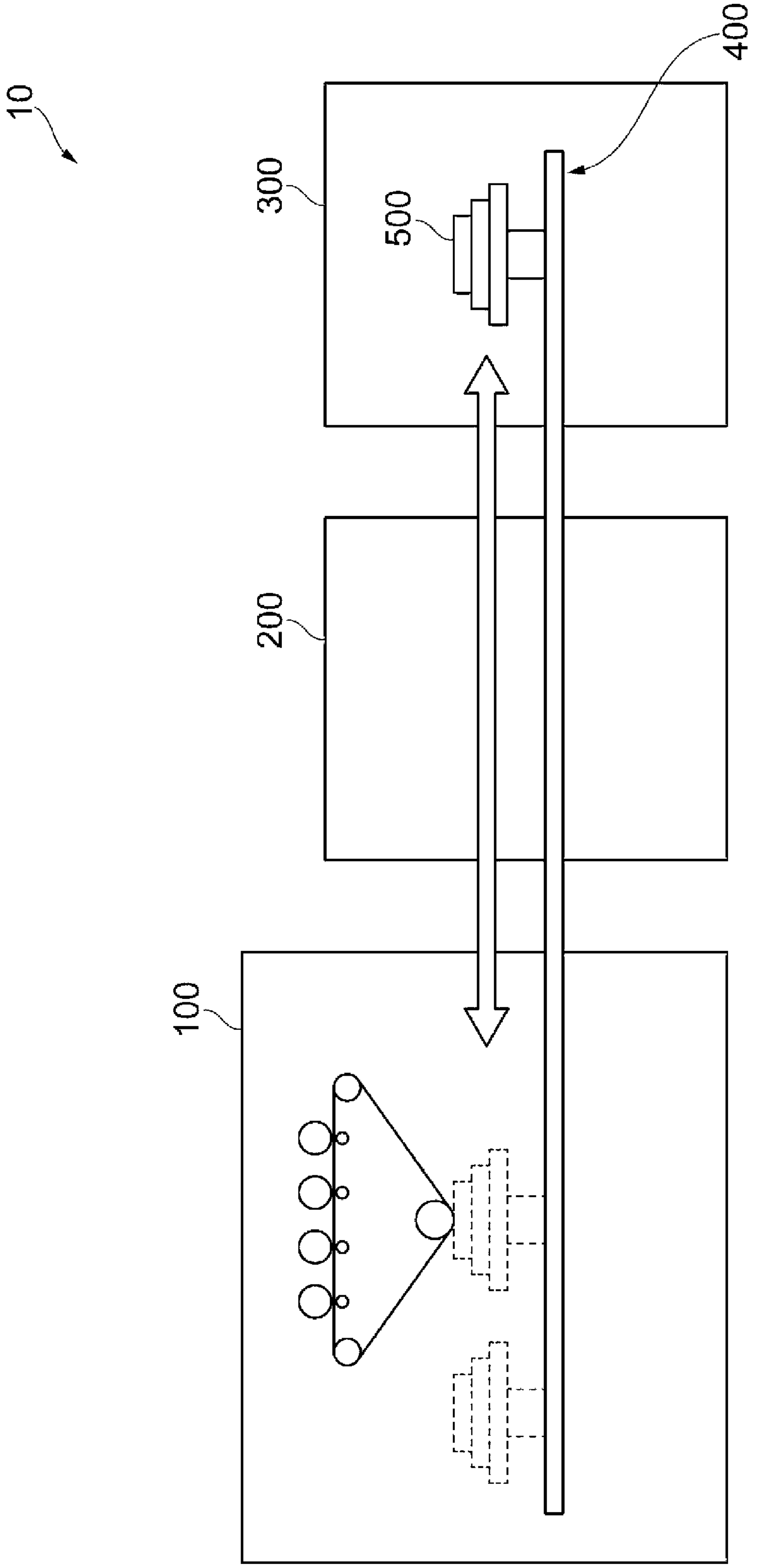
FIG. 1 illustrates a configuration of an image forming apparatus to which the present exemplary embodiment is applied.

FIG. 1 illustrates a configuration of an image forming apparatus to which the present exemplary embodiment is applied. The image forming apparatus 10 includes a transfer unit 100, a fixing unit 200, a medium attaching detaching unit 300, and a transport mechanism 400. Furthermore, the image forming apparatus 10 includes a controller (not illustrated) having one or more processors, which are computing units, a memory serving as a working region in data processing, and a storage device that holds a program and data. The controller may be a single controller that controls operation of the whole image forming apparatus or may be controllers individually provided in units such as the transfer unit 100, the fixing unit 200, and the transport mechanism 400.

The transfer unit 100 is a unit that transfers an image formed with particles such as toner onto a medium 500. The fixing unit 200 is a unit that fixes, on a surface of the medium 500, an image transferred by the transfer unit 100 by heating the medium 500. The medium attaching detaching unit 300 is a unit in which a user of the image forming apparatus 10 attaches the medium 500 to an attachment table (described later) provided in the transport mechanism 400. The transport mechanism 400 is provided across the transfer unit 100, the fixing unit 200, and the medium attaching detaching unit

300, and transports the medium 500 on which an image is to be printed to the units 100, 200, and 300 as indicated by the arrow in FIG. 1.

The medium attaching detaching unit 300 is a housing having an opening through which the medium 500 can be carried into and out of the medium attaching detaching unit 300. In the medium attaching detaching unit 300, one end portion of a transport rail 410 that constitutes the transport mechanism 400 is located, and a transport start position and a transport end position are set. This will be described in detail later. In the present exemplary embodiment, the transport start position and the transport end position are set at the same position. In an initial state, an attachment table 420 that constitutes the transport mechanism 400 is disposed at the position of the transport rail 410 set as the transport start position and the transport end position. The user attaches a jig 423 holding the medium 500 to the attachment table 420 by putting the jig 423 into the housing of the medium attaching detaching unit 300 through the opening, thereby making the medium 500 transportable by the transport mechanism 400. After an image is transferred onto the medium 500 by the transfer unit 100 and fixed by the fixing unit 200, the attachment table 420 on which the medium 500 is placed moves along the transport rail 410 and reaches the transport end position. In this state, the user detaches the jig 423 holding the medium 500 from the attachment table 420 and takes the jig 423 out through the opening of the housing of the medium attaching detaching unit 300.

Configuration of Transfer Unit 100

Figure 2:
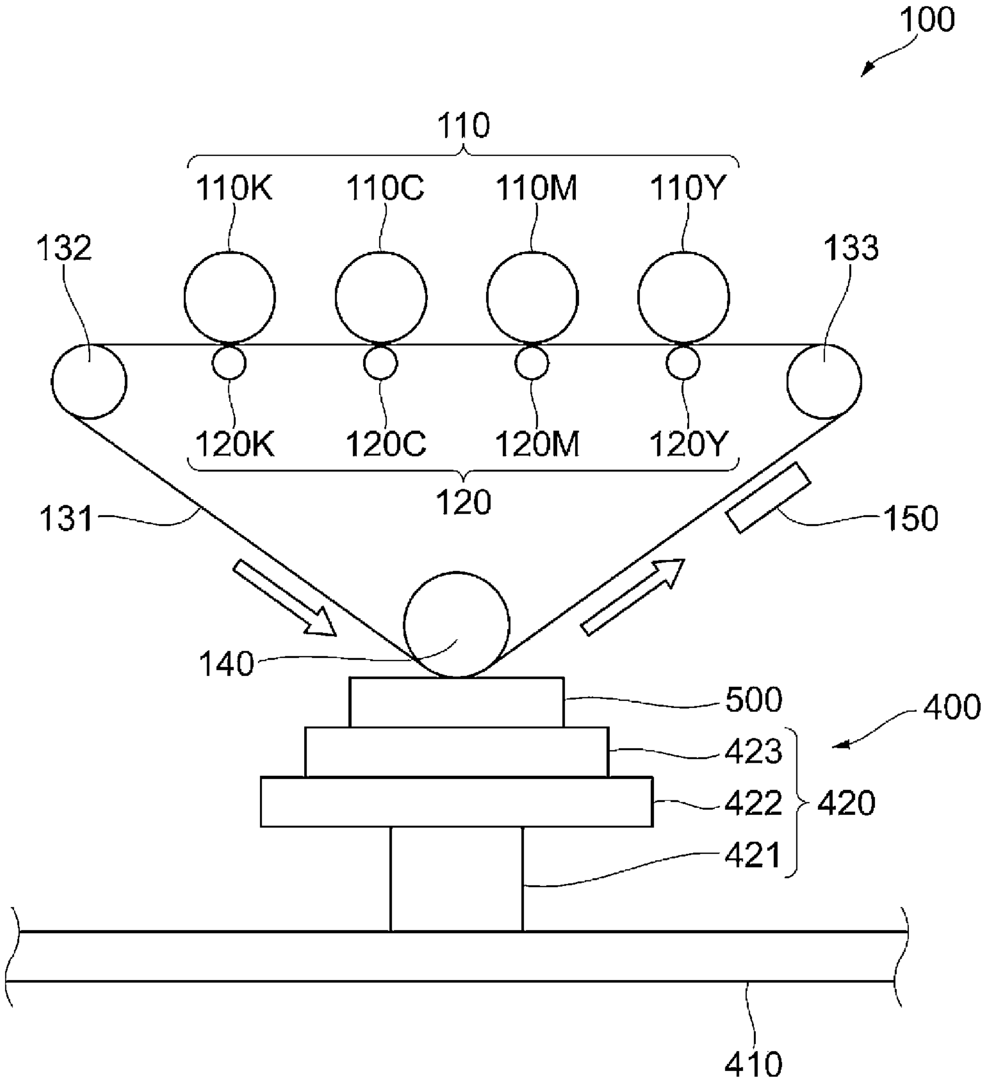
FIG. 2 illustrates a configuration of a transfer unit.

FIG. 2 illustrates a configuration of the transfer unit 100. The transfer unit 100 forms an image with charged particles and transfers the image onto the medium 500 by generating an electric field. The transfer unit 100 includes a developing device 110, a first transfer roll 120, and an intermediate transfer belt 131. The intermediate transfer belt 131 is tensioned between the developing device 110 and a position where an image is transferred onto the medium 500 by rollers 132 and 133 and a backup roll 140. Furthermore, the transfer unit 100 includes a cleaning device 150 for removing particles attached to the intermediate transfer belt 131.

The developing device 110 is a unit that forms, on a photoreceptor, an electrostatic latent image of an image to be transferred and develops the image by attaching charged particles to the electrostatic latent image on the photoreceptor. As the developing device 110, an existing device used in an electrophotographic image forming apparatus can be used. FIG. 2 illustrates an example of a configuration employed in a case where color image formation processing is performed by using four colors, that is, three colors: yellow, magenta, and cyan, and an additional one color: black. The developing device 110 is provided for each of these colors, and the developing devices 110 for yellow, magenta, cyan, and black are given suffixes Y, M, C, and K indicative of the colors in FIG. 2. In the following description, the suffixes are omitted in a case where the colors of the developing devices 110 need not be distinguished although the suffixes Y, M, C, and K are given to the reference signs in a case where the colors are distinguished.

The first transfer roll 120 is a unit used to transfer (first transfer) an image formed by the developing device 110 onto the intermediate transfer belt 131. The first transfer roll 120 is disposed so as to face the photoreceptor of the developing device 110, and the intermediate transfer belt 131 is located between the developing device 110 and the first transfer roll 120. The first transfer roll 120 is provided corresponding to each of the developing devices 110Y, 110M, 110C, and 110K. In FIG. 2, the first transfer rolls 120 corresponding to the developing devices 110Y, 110M, 110C, and 110K of the respective colors are given suffixes Y, M, C, and K indicative of the colors. In the following description, the suffixes are omitted in a case where the colors of the first transfer rolls 120 need not be distinguished although the suffixes Y, M, C, and K are given to the reference signs in a case where the colors are distinguished.

The intermediate transfer belt 131, the rollers 132 and 133, and the backup roll 140 are units used to transfer an image formed by the developing device 110 onto the medium 500. As illustrated in FIG. 2, the intermediate transfer belt 131 rotates in a direction indicated by the arrows in FIG. 2 (a counterclockwise direction in the example illustrated in FIG. 2) while being suspended around the rollers 132 and 133 and the backup roll 140 in a tensioned state. For example, one or both of the rollers 132 and 133 is(are) a roller(s) that is(are) driven to rotate, and the intermediate transfer belt 131 is pulled by rotation of this (these) roller(s). In this way, the intermediate transfer belt 131 rotates.

An outer surface of the intermediate transfer belt 131 in the example of the configuration in FIG. 2 is a surface (hereinafter referred to as a "transfer surface") on which an image is held. An image is transferred from the photoreceptor of the developing device 110 onto the transfer surface of the intermediate transfer belt 131 when the intermediate transfer belt 131 passes between the developing device 110 and the first transfer roll 120. In the example of the configuration illustrated in FIG. 2, images of the respective colors: yellow (Y), magenta (M), cyan (C), and black (K) are superimposed on the transfer surface by the developing devices 110Y, 110M, 110C, and 110K and the first transfer rolls 120Y, 120M, 120C, and 120K, and thus a multi-color image is formed.

The backup roll 140 transfers (second transfer) the image onto the medium 500 by bringing the transfer surface of the intermediate transfer belt 131 into contact with the medium 500. A predetermined voltage is applied to the backup roll 140 when the image is transferred. This generates an electric field (hereinafter referred to as a "transfer electric field") in a range including the backup roll 140 and the medium 500, thereby transferring the image formed with charged particles from the intermediate transfer belt 131 onto the medium 500. As described above, to transfer an image from the intermediate transfer belt 131 onto the medium 500, an electric current need to flow from the backup roll 140 to the medium 500 through the intermediate transfer belt 131. In a case where the medium 500 is a conductor such as a metal, an electric current flows through the medium 500 itself, and therefore an image is transferred onto a surface of the medium 500 by generating a transfer electric field. On the other hand, in a case where the medium 500 is not a conductor, no electric current flows through the medium, and therefore an image cannot be transferred in this state. In view of this, in a case where the medium 500 is not a conductor, an electric current is passed through the medium 500 by taking a measure such as forming a layer made of an electrically conductive material (hereinafter referred to as an "electrically conductive layer") in advance in at least a region on the surface of the medium 500 where an image is to be formed.

A procedure of transfer of an image by the intermediate transfer belt 131 is described. When the intermediate transfer belt 131 rotates, images of the respective colors: yellow (Y), magenta (M), cyan (C), and black (K) are sequentially superimposed on the transfer surface (outer surface in FIG. 2) of the intermediate transfer belt 131 by the developing devices 110Y, 110M, 110C, and 110K and the first transfer rolls 120Y, 120M, 120C, and 120K, and thus a multi-color image is formed. When the intermediate transfer belt 131 further rotates, the image formed on the transfer surface of the intermediate transfer belt 131 reaches a position (hereinafter referred to as a "transfer position") where the intermediate transfer belt 131 makes contact with the medium 500. As described above, a voltage is applied to the backup roll 140. This generates a transfer electric field, thereby transferring the image from the intermediate transfer belt 131 onto the medium 500.

The cleaning device 150 is a unit that removes particles attached to the transfer surface of the intermediate transfer belt 131. The cleaning device 150 is provided at a position on a downstream side relative to the transfer position and an upstream side relative to the developing device 110Y and the first transfer roll 120Y in a direction in which the intermediate transfer belt 131 rotates. With this configuration, particles remaining on the transfer surface of the intermediate transfer belt 131 are removed by the cleaning device 150 after the image is transferred from the intermediate transfer belt 131 onto the medium 500. In a next operation cycle, an image is newly transferred (first transfer) onto the transfer surface from which particles have been removed.

Configuration of Transport Mechanism 400 and Attachment Structure for Attachment of Medium 500

An attachment structure for attachment of the medium 500 is described. In the present exemplary embodiment, it is assumed that the medium 500 can have various thicknesses and shapes. In a case where the medium 500 directly placed on a transport path constituted by a belt and a roller is transported, it is difficult to appropriately bring the intermediate transfer belt 131 into contact with the medium 500 since a height of the medium 500 relative to the transport path varies at the transfer position of the transfer unit 100 in a case where a thickness and a shape of the medium 500 vary. Specifically, such a situation can occur in which the medium 500 does not make contact with the intermediate transfer belt 131 in a case where the height of the medium 500 is low, and a strong shock is caused when the medium 500 makes contact with the intermediate transfer belt 131 in a case where the height of the medium 500 is high. In view of this, the transport mechanism 400 according to the present exemplary embodiment has the attachment table 420 having a height controller and transports the medium 500 placed on the attachment table 420 together with the attachment table 420.

The transport mechanism 400 includes the transport rail 410 that specifies a transport path for the medium 500 and the attachment table 420 that moves on the transport rail 410 (see FIG. 2). The attachment table 420 includes a leg part 421 attached to the transport rail 410 and a table part 422 on which the medium 500 is to be placed. Furthermore, the jig 423 that holds the medium 500 on the table part 422 is attached to the table part 422. The transport mechanism 400 is an example of a transport unit.

In the example of the configuration illustrated in FIG. 1, the transport rail 410 is disposed so as to extend from the medium attaching detaching unit 300 to the transfer unit 100 while passing the fixing unit 200. An end portion of the transport rail 410 on a medium attaching detaching unit 300 side is the transport start position and the transport end position. The attachment table 420 is transported leftward in FIG. 1 from the transport start position of the medium attaching detaching unit 300, and an image is transferred onto the medium 500 in the transfer unit 100. After the image transfer, the attachment table 420 is transported rightward in FIG. 1, and reaches the transport end position of the medium attaching detaching unit 300 after the image is fixed on the medium 500 in the fixing unit 200.

The leg part 421 is attached to the transport rail 410 and moves on the transport rail 410. A mechanism for moving the leg part 421 on the transport rail 410 is not limited in particular. For example, the leg part 421 may be provided with a driving device so as to be movable on its own or the transport rail 410 may be provided with a unit that pulls the leg part 421. Furthermore, the leg part 421 has a height controller that controls a height of the table part 422. The leg part 421 is an example of a height adjusting unit. A configuration of the height controller is not limited in particular. For example, the table part 422 may be moved up and down by rack and pinion and a drive motor. Alternatively, the height of the table part 422 may be controlled by manually operating a gear that is linked with the height of the table part 422. Furthermore, various methods can be used as an operation method for controlling the height. For example, an input interface for input to a controller of the drive motor may be prepared, and an operator of the image forming apparatus 10 may manually input and set height data by using the input interface. Alternatively, the height of the medium 500 attached to the attachment table 420 may be automatically detected by using a sensor, and the drive motor may be controlled so that the medium 500 is located at an appropriate height.

The table part 422 is a table that is attached to the leg part 421 and on which the medium 500 is placed with the jig 423 interposed therebetween. The table part 422 is provided with a fastener (not illustrated) for positioning the jig 423. Any jigs 423 compatible with this fastener can be positioned and attached to the table part 422 irrespective of shapes thereof.

Furthermore, the table part 422 is attached so as to float up and sink down with respect to the leg part 421 in accordance with a pressure applied from an upper side. The configuration in which the table part 422 floats up and sinks down is, for example, realized by interposing an elastic body at a portion where the table part 422 and the leg part 421 are joined. By employing such a configuration, a shock caused when the medium 500 held by the jig 423 attached to the table part 422 makes contact with the intermediate transfer belt 131 of the transfer unit 100 is lessened.

The jig 423 is a device for holding the medium 500 and is attached to the table part 422. A portion of the jig 423 attached to the table part 422 has a shape and a structure compatible with the fastener of the table part 422. Furthermore, the jig 423 has a shape for holding the medium 500. Therefore, media 500 having various shapes and sizes can be placed on the attachment table 420 by preparing jigs 423 compatible with the shapes and sizes of the media 500.

Preliminary Operation of Image Formation

The image forming apparatus 10 according to the present exemplary embodiment has the transport mechanism 400 configured as above and therefore can print an image on any of the media 500 having various shapes and sizes. However, before start of image transfer operation, the height of the table part 422 is controlled in order to prevent a strong shock from being caused by contact of the medium 500 with the intermediate transfer belt 131 of the transfer unit 100 or prevent failure to bring the medium 500 into contact with the intermediate transfer belt 131 when an image is transferred onto the medium 500.

Figure 3A:
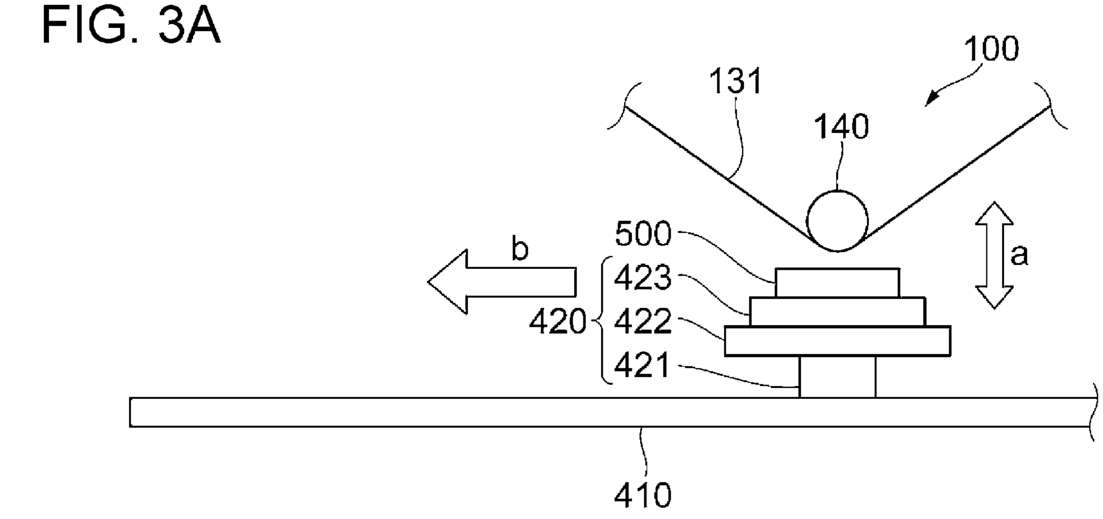
FIGS. 3A to 3C illustrate operation of a transport mechanism before start of image formation by the transfer unit.
Figure 3B:
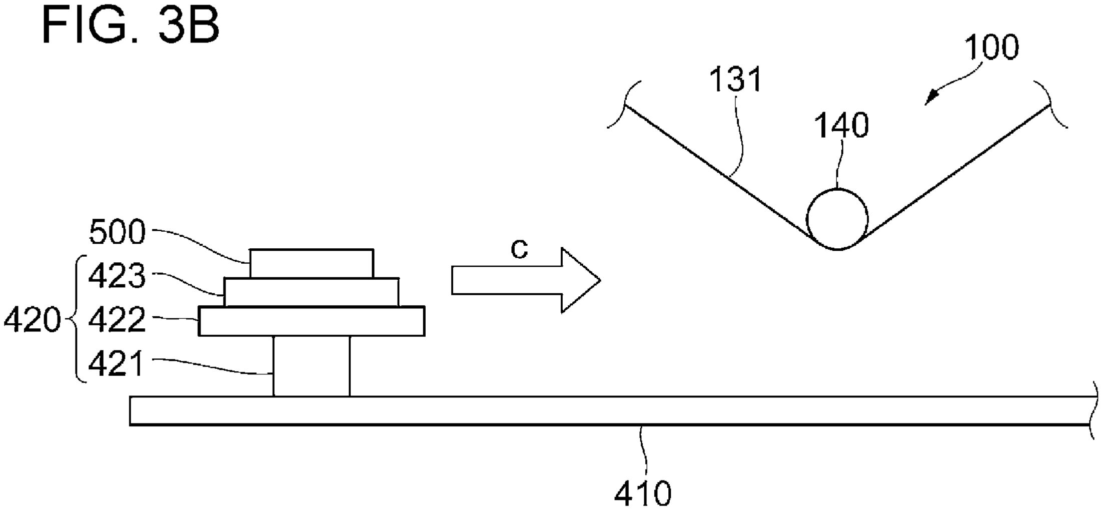
Figure 3C:
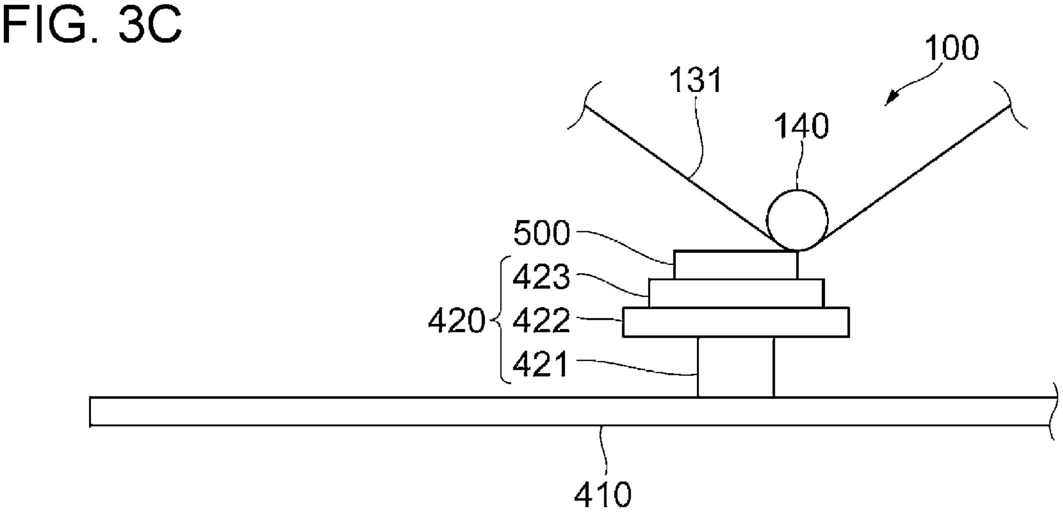

FIGS. 3A to 3C illustrate operation of the transport mechanism 400 before start of image formation by the transfer unit 100. FIG. 3A illustrates how the height is controlled, FIG. 3B illustrates a state where the attachment table 420 has retreated to a preparation position after the height control, and FIG. 3C illustrates a state where the transfer unit 100 starts transfer of an image.

In a case where an image is formed on the medium 500, first, the medium 500 held by the jig 423 is placed on the attachment table 420 at the transport start position of the medium attaching detaching unit 300. Then, the medium 500 is lowered to a height at which the medium 500 does not make contact with the intermediate transfer belt 131 of the transfer unit 100 by the height controller of the attachment table 420, and then the attachment table 420 on which the medium 500 is placed is moved to a position below the transfer position of the transfer unit 100.

Next, the height of the attachment table 420 is controlled so that the medium 500 makes contact with the intermediate transfer belt 131 with a strength appropriate for transfer of the image at the transfer position (arrow a in FIG. 3A). When the height is controlled, information on an appropriate height (hereinafter referred to as a "transfer execution height") thus obtained is held, for example, in the memory of the controller. Then, the attachment table 420 is lowered to a height where the medium 500 does not make contact with the intermediate transfer belt 131 and moves to the preparation position for transfer operation (arrow b in FIG. 3A).

When the attachment table 420 moves to the preparation position, the height of the attachment table 420 is adjusted to the transfer execution height on the basis of the information obtained in the height control. Then, the attachment table 420 moves to the transfer position (arrow c in FIG. 3B), and transfer of the image starts when the medium 500 makes contact with the intermediate transfer belt 131 at the transfer position (FIG. 3C).

Configuration of Fixing Unit 200

After the image is transferred onto the medium 500 in the transfer unit 100, the image is fixed in the fixing unit 200. In the present exemplary embodiment, an image is formed on any of the media 500 having various thicknesses and shapes, and therefore the fixing processing is performed by a non-contact-type device. The fixing unit 200 melts particles forming the image transferred onto the medium 500 by heating the particles and thereby fixes the particles on the surface of the medium 500.

Figure 4A:
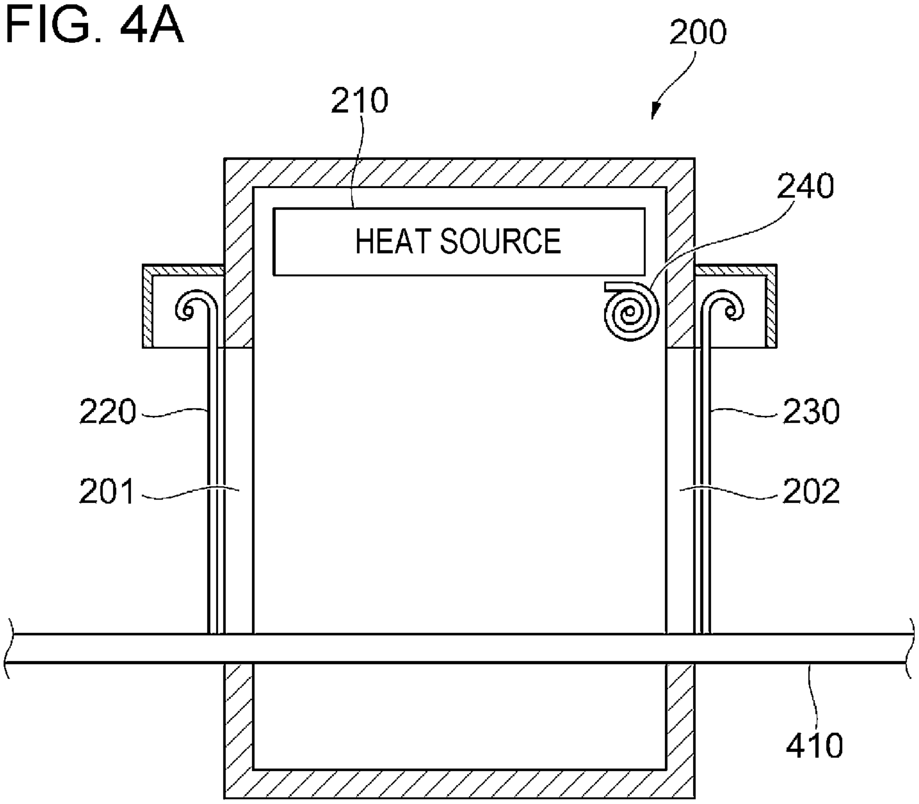
FIGS. 4A and 4B illustrate a configuration and operation of a fixing unit.
Figure 4B:
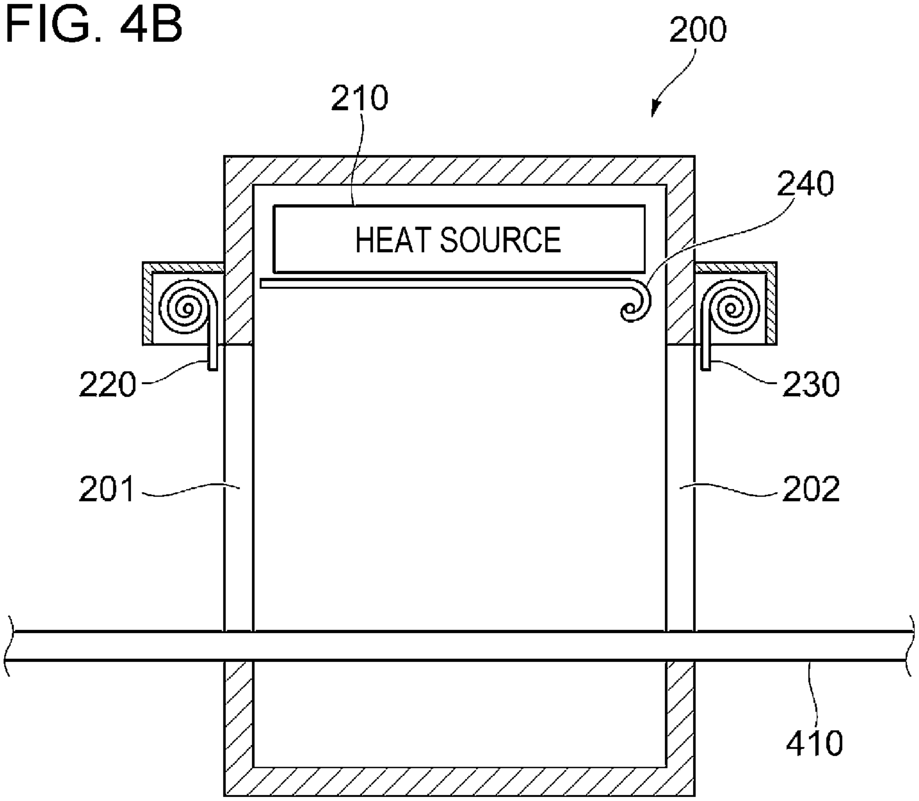

FIGS. 4A and 4B illustrate a configuration and operation of the fixing unit 200. FIG. 4A illustrates a state where openings of the fixing unit 200 are closed, and FIG. 4B illustrates a state where the openings of the fixing unit 200 are opened. The fixing unit 200 includes a carry-in opening 201, which is an opening through which the medium 500 is carried into the fixing unit 200, and a carry-out opening 202, which is an opening through which the medium 500 is carried out of the fixing unit 200. Furthermore, the carry-in opening 201 and the carry-out opening 202 of the fixing unit 200 according to the present exemplary embodiment are provided with an opening and closing member and are configured to be opened when the medium 500 is carried into or out of the fixing unit 200 and be closed when the fixing processing is performed.

In this example, an opening on a side where the medium 500 is carried into the fixing unit 200 when image fixing processing is performed by the fixing unit 200 is the carry-in opening 201, and an opening on a side where the medium 500 is carried out of the fixing unit 200 is the carry-out opening 202. In other words, an opening in a side surface that faces the transfer unit 100 is the carry-in opening 201, and an opening in a side surface that faces the medium attaching detaching unit 300 is the carry-out opening 202. In the example illustrated in FIGS. 4A and 4B, an opening on a left side is the carry-in opening 201, and an opening on a right side is the carry-out opening 202. In the image forming apparatus 10 according to the present exemplary embodiment, the medium 500 passes through the fixing unit 200 when the medium 500 is transported from the transport start position of the medium attaching detaching unit 300 to the transfer unit 100. In this case, the medium 500 enters the fixing unit 200 through the carry-out opening 202 and exits the fixing unit 200 through the carry-in opening 201, in a manner opposite to the case where the fixing processing is performed. However, in the present exemplary embodiment, the carry-in opening 201 and the carry-out opening 202 are set as described above on the basis of operation performed when the fixing processing is performed in the fixing unit 200.

The fixing unit 200 includes a heat source 210 for thermal fixation. The heat source 210 can be, for example, any of various existing heat sources such as a halogen lamp, a ceramic heater, and an infrared lamp. Instead of the heat source 210, a device that heats particles forming the image by emitting infrared laser may be used. The fixing unit 200 according to the present exemplary embodiment is provided with a member that can cover the heat source 210, and is configured so that the heat source 210 is exposed when the fixing processing is performed.

In the example illustrated in FIGS. 4A and 4B, roll-up shutters 220 and 230 are provided as the opening and closing members of the carry-in opening 201 and the carry-out opening 202. The shutters 220 and 230 are closed (see FIG. 4A) except when the medium 500 is carried into and out of the fixing unit 200 and thereby prevent a decrease in internal temperature. The shutter 220 of the carry-in opening 201 opens when the medium 500 is carried into the fixing unit 200, and the shutter 230 of the carry-out opening 202 opens when the medium 500 is carried out of the fixing unit 200 (see FIG. 4B).

In the example illustrated in FIGS. 4A and 4B, a roll-up shutter 240 is provided as the covering member that covers the heat source 210. The shutter 240 closes in a case where the shutter 220 of the carry-in opening 201 and/or the shutter 230 of the carry-out opening 202 open(s) (see FIG. 4B). This may keep a decrease in temperature of the heat source 210 small even in a case where the carry-in opening 201 and/or the carry-out opening 202 open(s) and the internal temperature decreases.

In the example illustrated in FIG. 4B, a state where both of the shutter 220 of the carry-in opening 201 and the shutter 230 of the carry-out opening 202 are opened is illustrated for convenience of description. In actual operation, the shutter 230 of the carry-out opening 202 remains closed when the medium 500 is carried into the fixing unit 200, and the shutter 220 of the carry-in opening 201 remains closed when the medium 500 is carried out of the fixing unit 200. This keeps a decrease in internal temperature small.

The shutters 220, 230, and 240 illustrated in FIGS. 4A and 4B are an example of the opening and closing members of the carry-in opening 201 and the carry-out opening 202 and the covering member of the heat source 210. The opening and closing members and covering member are not limited to the above configuration, as long as the opening and closing members and covering member keep a decrease in internal temperature of the fixing unit 200 and temperature of the heat source 210 small. For example, an opening and closing door may be provided instead of the shutters 220, 230, and 240 illustrated in FIGS. 4A and 4B. As the opening and closing member of the carry-out opening 202 through which the medium 500 passes after the fixing processing is finished, a curtain made of a heat insulating material or air curtain may be used to prevent leakage of internal air.

Modifications of Transport Path

As illustrated in FIG. 1, the transport mechanism 400 according to the present exemplary embodiment moves the medium 500 from the transport start position of the medium attaching detaching unit 300 to the transfer unit 100 and then moves the medium 500 from the transfer unit 100 to the transport end position of the medium attaching detaching unit 300. Accordingly, the transport start position and the transport end position of the medium 500 transported by the transport mechanism 400 are on the same side relative to the transfer unit 100. With this configuration, in the image forming apparatus 10 according to the present exemplary embodiment, the transport path is shorter than in a case where the transport start position and the transport end position are located on opposite sides relative to the transfer unit 100. This contributes to a reduction in size of the image forming apparatus 10.

In the present exemplary embodiment, the transport mechanism 400 moves the medium 500 from the transport start position to the transfer unit 100 and then moves the medium 500 to the preparation position after adjustment of the height of the attachment table 420. Then, the transport mechanism 400 causes the medium 500 to pass the transfer position to transfer an image onto the medium 500, and then moves the medium 500 to the fixing unit 200 and then to the transport end position. In this configuration illustrated in FIG. 1, the preparation position in this transport process is set on a side opposite to the transport start position relative to the transfer position of the transfer unit 100. Accordingly, as a whole, the transport mechanism 400 causes the medium 500 to move from the transport start position to the preparation position, turn back at the preparation position, and move to the transport end position. However, the present exemplary embodiment is not limited to the configuration illustrated in FIG. 1 as long as the transport start position and the transport end position are located on the same side relative to the transfer unit 100. Some modifications of the transport path are illustrated below.

Figure 5:
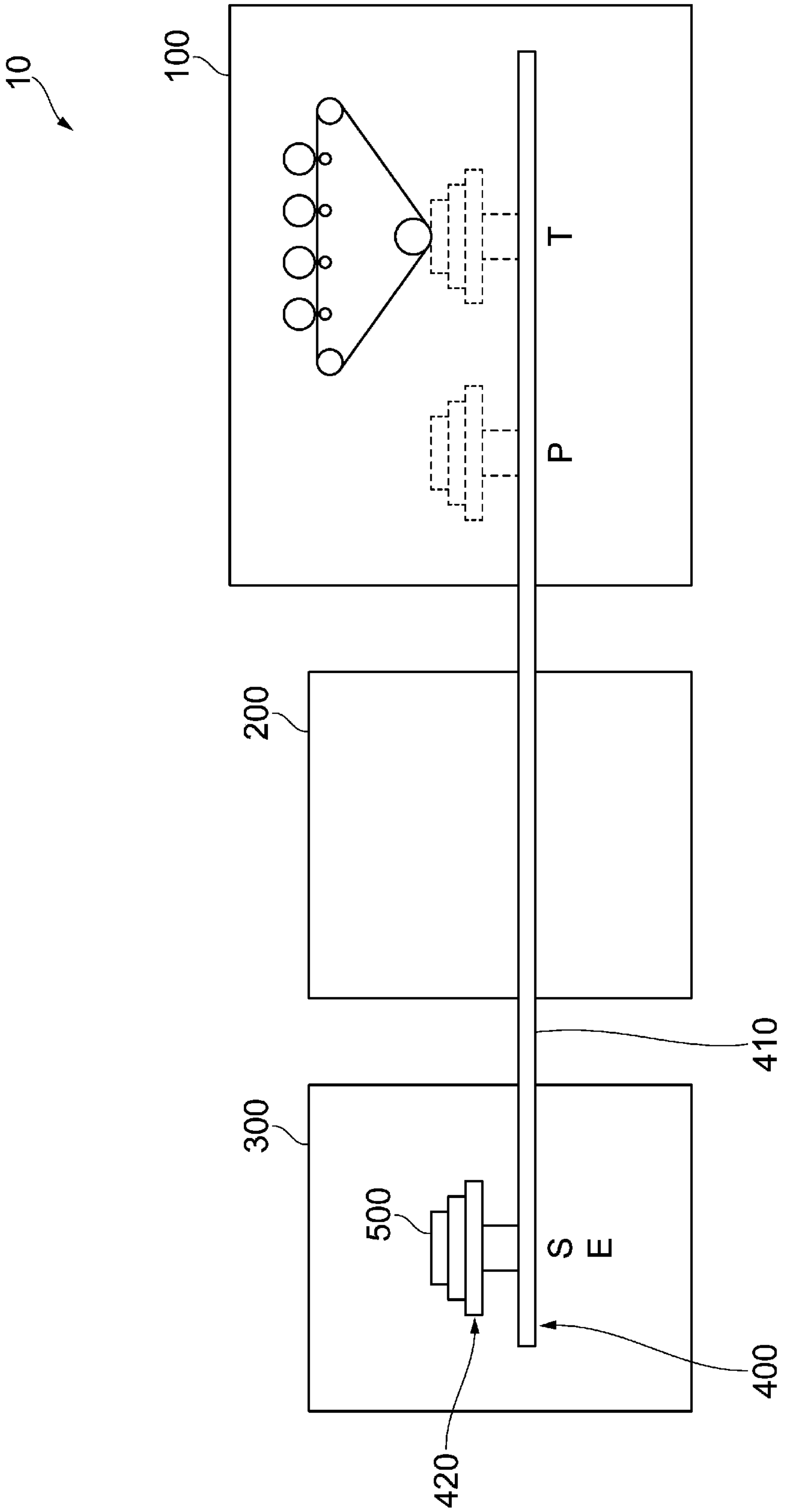
FIG. 5 illustrates a modification of the image forming apparatus according to the present exemplary embodiment.

FIG. 5 illustrates a modification of the image forming apparatus 10 according to the present exemplary embodiment. On the transport path formed by the transport rail 410 of the transport mechanism 400 illustrated in FIG. 5, a preparation position P in the transfer unit 100 is set on the same side as a transport start position S relative to a transfer position T of the transfer unit 100. Accordingly, in a transport process based on the configuration illustrated in FIG. 5, the transport mechanism 400 first moves the medium 500 from the transport start position S to the transfer unit 100, and then, after adjustment of the height of the attachment table 420, returns the medium 500 to the preparation position P located on a near side relative to the transfer position T of the transfer unit 100 when viewed from the transport start position S. Then, the transport mechanism 400 causes the medium 500 to pass the transfer position T to transfer an image onto the medium 500, turn back in the transport direction in a state where the height of the attachment table 420 is lowered to such a degree that the medium 500 does not make contact with the intermediate transfer belt 131 at the transfer position T, and move to the fixing unit 200 and then to a transport end position E.

Figure 6:
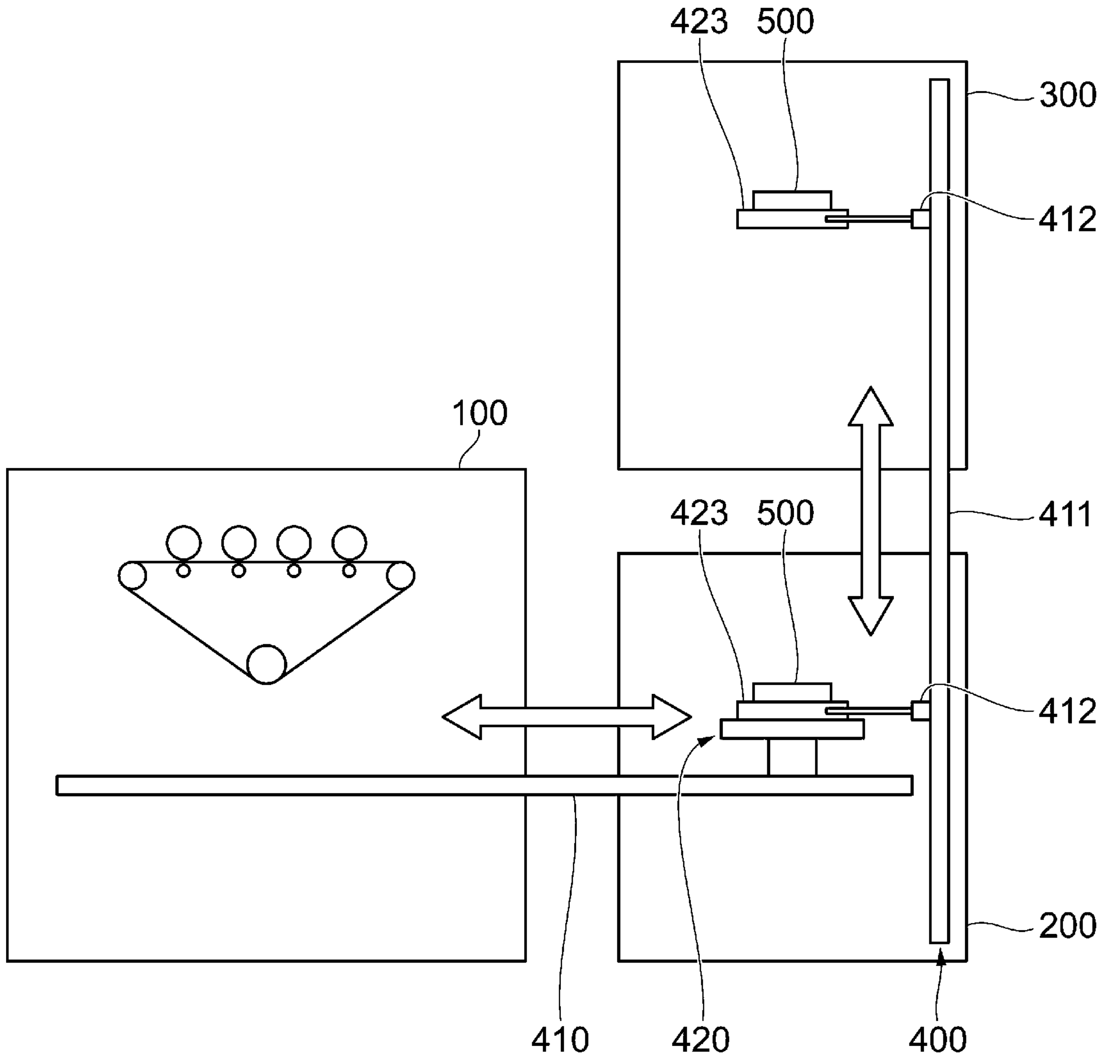
FIG. 6 illustrates another modification of the image forming apparatus according to the present exemplary embodiment.

FIG. 6 illustrates another modification of the image forming apparatus 10 according to the present exemplary embodiment. In the example of the configuration illustrated in FIG. 6, the medium attaching detaching unit 300 and the fixing unit 200 are arranged vertically in an up-down direction. Accordingly, the transport path of the transport mechanism 400 is configured such that lifting and lowering in the up-down direction and movement in a horizontal direction cross each other in the fixing unit 200. One specific example for realizing this is a configuration in which a lifting and lowering rail 411 is provided along a path between the medium attaching detaching unit 300 and the fixing unit 200 and a supporter 412 that supports the jig 423 is lifted and lowered along this lifting and lowering rail 411. A specific mechanism for lifting and lowering the supporter 412 along the lifting and lowering rail 411 is not limited in particular, and may be any of various existing mechanisms. In this example of the configuration, the fixing unit 200 has, in a side surface thereof that faces the transfer unit 100 and in an upper surface thereof, an opening through which the medium 500 passes, unlike the configuration illustrated in FIG. 4.

In the example of the configuration illustrated in FIG. 6, in the medium attaching detaching unit 300 above the fixing unit 200, a user places the medium 500 by attaching the medium 500 held by the jig 423 to the supporter 412. When transport starts, the supporter 412 is lowered along the lifting and lowering rail 411. Then, in the fixing unit 200, the jig 423 is attached to the table part 422 of the attachment table 420, and the supporter 412 is detached from the jig 423. Then, the attachment table 420 on which the medium 500 is placed moves on the transport rail 410 to the transfer unit 100, and an image is transferred onto the medium 500 in the transfer unit 100.

Next, the attachment table 420 on which the medium 500 is placed moves on the transport rail 410 to the fixing unit 200, and the image is thermally fixed on the medium 500. Then, the supporter 412 is attached to the jig 423, and the jig 423 is detached from the table part 422 of the attachment table 420. Then, the supporter 412 to which the jig 423 holding the medium 500 has been attached is lifted along the lifting and lowering rail 411 and reaches the transport end position of the medium attaching detaching unit 300.

Figure 7:
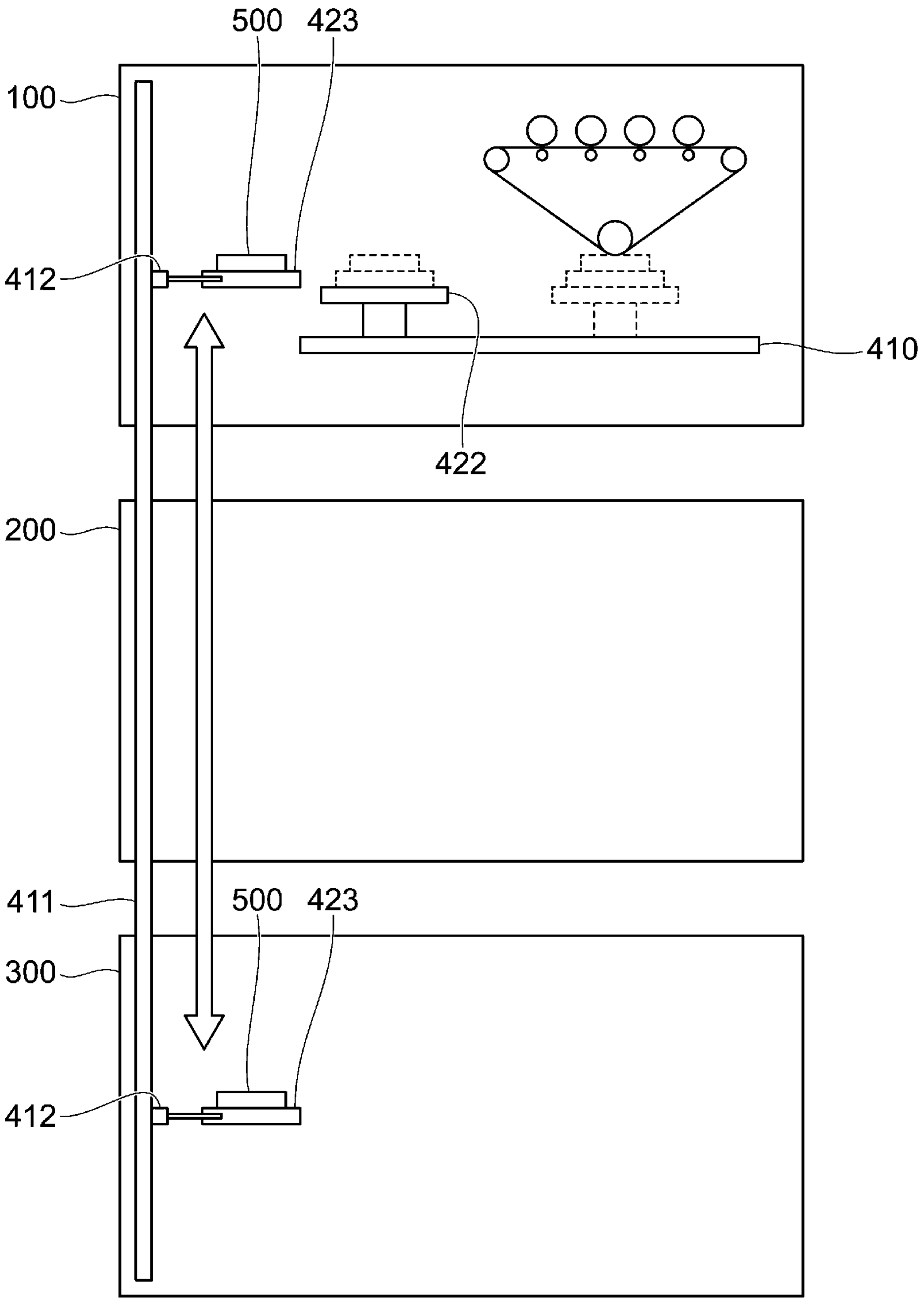
FIG. 7 illustrates another modification of the image forming apparatus according to the present exemplary embodiment.

FIG. 7 illustrates another modification of the image forming apparatus 10 according to the present exemplary embodiment. In the example of the configuration illustrated in FIG. 7, the medium attaching detaching unit 300, the fixing unit 200, and the transfer unit 100 are vertically arranged in an up-down direction. Accordingly, the transport path of the transport mechanism 400 is a lifting and lowering path extending in the up-down direction from the medium attaching detaching unit 300 to the transfer unit 100. One specific example for realizing this is a configuration in which the lifting and lowering rail 411 is provided to extend from the medium attaching detaching unit 300 to the transfer unit 100 and the supporter 412 that supports the jig 423 is lifted and lowered along the lifting and lowering rail 411, as in the configuration described with reference to FIG. 6. A specific mechanism for lifting and lowering the supporter 412 along the lifting and lowering rail 411 is not limited in particular, and may be any one of various existing mechanisms. In this example of the configuration, the fixing unit 200 has, in an upper surface and a lower surface thereof in the transport direction in which the medium 500 is transported, an opening through which the medium 500 passes, unlike the configuration illustrated in FIG. 4.

In the example of the configuration illustrated in FIG. 7, in the medium attaching detaching unit 300 below the fixing unit 200, a user places the medium 500 by attaching the medium 500 held by the jig 423 to the supporter 412. When transport starts, the supporter 412 is lifted along the lifting and lowering rail 411, passes the fixing unit 200, and moves to the transfer unit 100. Then, in the transfer unit 100, the jig 423 is attached to the table part 422 of the attachment table 420, and the supporter 412 is detached from the jig 423. Then, the attachment table 420 moves on the transport rail 410 to the transfer position, and an image is transferred onto the medium 500.

Next, the supporter 412 is attached to the jig 423 again, and the jig 423 is detached from the table part 422 of the attachment table 420. Then, the supporter 412 to which the jig 423 holding the medium 500 has been attached is lowered along the lifting and lowering rail 411. Then, in the fixing unit 200, the image is thermally fixed on the medium 500. Then, the supporter 412 is further lowered along the lifting and lowering rail 411, and reaches the transport end position of the medium attaching detaching unit 300.

Although the exemplary embodiment of the present disclosure has been described above, the technical scope of the present disclosure is not limited to the above exemplary embodiment. For example, although the transport start position and the transport end position of the medium 500 are located at the same position in the above exemplary embodiment, the transport start position and the transport end position need just be set on the same side relative to the transfer unit 100 and need not necessarily be located at the same position. Various changes and substitutions of the configurations are encompassed within the present disclosure without departing from the scope of the technical idea of the present disclosure.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

An image forming apparatus including: an attachment table to which an object is attached; a transfer unit that transfers an image onto the object; and a transport unit that transports the attachment table along a transport path that has a transport start position on one side relative to the transfer unit and has a transport end position on a same side as the transport start position relative to the transfer unit, the transport path extending beyond the transfer unit and the attachment table being transported so as to turn back at a position beyond the transfer unit.

(((2)))

The image forming apparatus according to (((1))), further including a height adjusting unit that adjusts a height of the attachment table, wherein the transport unit transports the attachment table to which the object has been attached to a transfer position of the transfer unit, and the height adjusting unit adjusts a height of the attachment table in accordance with a height of the object attached to the attachment table at the transfer position.

(((3)))

The image forming apparatus according to (((2))), wherein after the adjustment of the height of the attachment table by the height adjusting unit, the transport unit moves the attachment table to a preparation position set on a side opposite to the transport start position relative to the transfer unit, and causes the attachment table to turn back from the preparation position; and the transfer unit transfers an image onto the object attached to the attachment table that is transported from the preparation position.

(((4)))

The image forming apparatus according to (((2))), wherein after the adjustment of the height of the attachment table by the height adjusting unit, the transport unit moves the attachment table to a preparation position set on a same side as the transport start position relative to the transfer unit; the transfer unit transfers an image onto the object attached to the attachment table transported from the preparation position; and after end of the transfer of the image by the transfer unit, the transport unit causes the attachment table to turn back and be transported to the transport end position.

(((5)))

The image forming apparatus according to any one of (((1))) to (((4))), wherein the transport start position and the transport end position are a same position.

(((6)))

The image forming apparatus according to any one of (((1))) to (((5))), wherein the object is attachable and detachable to and from the attachment table at the transport start position and the transport end position.

What is claimed is:

1. An image forming apparatus comprising:

an attachment table to which an object is attached;

a transfer unit that transfers an image onto the object;

a transport unit that transports the attachment table along a transport path that has a transport start position on one side relative to the transfer unit, has a transfer position where the image being transferred onto the object by the transfer unit, and has a transport end position on a same side as the transport start position relative to the transfer position in an extending direction of the transport path, the transport path extending beyond the transfer unit and the attachment table being transported so as to turn back at a position beyond the transfer unit; and a height adjusting unit that adjusts a height of the attachment table, wherein the height adjusting unit is configured to lower the height of the attachment table to which the object is attached to form a gap between the transfer unit and the object with the image from the position beyond the transfer unit to the transport end position.

2. The image forming apparatus according to claim 1, wherein:

the transport unit transports the attachment table to which the object has been attached to the transfer position of the transfer unit; and the height adjusting unit adjusts a height of the attachment table in accordance with a height of the object attached to the attachment table at the transfer position.

3. The image forming apparatus according to claim 2, wherein:

after the adjustment of the height of the attachment table by the height adjusting unit, the transport unit moves the attachment table to a preparation position set on a side opposite to the transport start position relative to the transfer unit, and causes the attachment table to turn back from the preparation position; and the transfer unit transfers an image onto the object attached to the attachment table that is transported from the preparation position.

4. The image forming apparatus according to claim 2, wherein:

after the adjustment of the height of the attachment table by the height adjusting unit, the transport unit moves the attachment table to a preparation position set on a same side as the transport start position relative to the transfer unit;

the transfer unit transfers an image onto the object attached to the attachment table transported from the preparation position; and after end of the transfer of the image by the transfer unit, the transport unit causes the attachment table to turn back and be transported to the transport end position.

5. The image forming apparatus according to claim 1, wherein:

the transport start position and the transport end position are a same position.

6. The image forming apparatus according to claim 5, wherein:

the object is attachable and detachable to and from the attachment table at the transport start position and the transport end position.

7. An image forming apparatus comprising:

an attachment table to which an object is attached;

transfer means for transferring an image onto the object; and transport means for transporting the attachment table along a transport path that has a transport start position on one side relative to the transfer means, has a transfer position where the image being transferred onto the object by the transfer means, and has a transport end position on a same side as the transport start position relative to the transfer position in an extending direction of the transport path, the transport path extending beyond the transfer means and the attachment table being transported so as to turn back at a position beyond the transfer means; and a height adjusting means for adjusting a height of the attachment table, wherein the height adjusting unit is configured to lower the height of the attachment table to which the object is attached to form a gap between the transfer unit and the object with the image from the position beyond the transfer unit to the transport end position.

8. The image forming apparatus according to claim 1, wherein the transport unit is configured to transport the attachment table attached with the object having the image back from the position beyond the transfer position to the transport end position.

* * * * *